(12) United States Patent
Van Zuiden et al.

(10) Patent No.: US 9,612,344 B2
(45) Date of Patent: Apr. 4, 2017

(54) POSITRON EMISSION TOMOGRAPHY AND SINGLE PHOTON EMISSION COMPUTED TOMOGRAPHY BASED ON INTENSITY ATTENUATION SHADOWING METHODS AND EFFECTS

(71) Applicant: Theta Point, LLC, Carlsbad, CA (US)

(72) Inventors: Everett Eugene Van Zuiden, Chula Vista, CA (US); Nicholas Disher, San Diego, CA (US); Weidong Luo, San Diego, CA (US); Lorenzo Ramirez Lugo, Carlsbad, CA (US)

(73) Assignee: THETA POINT, LLC, Carlsbad, CA (US)

( * ) Notice: Subject to any disclaimer, the term of this patent is extended or adjusted under 35 U.S.C. 154(b) by 82 days.

(21) Appl. No.: 14/606,215

(22) Filed: Jan. 27, 2015

(65) Prior Publication Data
US 2015/0212216 A1 Jul. 30, 2015

Related U.S. Application Data

(60) Provisional application No. 61/932,319, filed on Jan. 28, 2014.

(51) Int. Cl.
*G01T 1/164* (2006.01)

(52) U.S. Cl.
CPC .................................. *G01T 1/1648* (2013.01)

(58) Field of Classification Search
CPC ..................................................... G01T 1/1648
See application file for complete search history.

(56) References Cited

U.S. PATENT DOCUMENTS

| 7,692,156 B1* | 4/2010 | Nagarkar | G01T 1/1644 250/361 R |
| 8,837,793 B2* | 9/2014 | Rousso | G06T 11/006 250/363.1 |
| 2003/0111609 A1* | 6/2003 | Zeng | G01T 1/1648 250/363.1 |
| 2004/0251419 A1* | 12/2004 | Nelson | G01T 1/243 250/370.09 |
| 2012/0039446 A1* | 2/2012 | Cui | A61B 6/06 378/149 |
| 2013/0056638 A1* | 3/2013 | Inadama | G01T 1/1644 250/362 |

\* cited by examiner

*Primary Examiner* — Christine Sung
(74) *Attorney, Agent, or Firm* — Michael R Shevlin

(57) ABSTRACT

Methods of a high resolution, stationary imaging detector for use in systems for positron emission tomography or single photon emission tomography that uses shadowing effects from intensity attenuation to provide three dimensional positioning information for a source of activity within a field of view of the detector.

39 Claims, 6 Drawing Sheets

POSITRON EMISSION TOMOGRAPHY AND SINGLE PHOTON EMISSION COMPUTED TOMOGRAPHY BASED ON INTENSITY ATTENUATION SHADOWING METHODS AND EFFECTS

CROSS-REFERENCE TO RELATED APPLICATIONS

This application claims priority to U.S. Provisional Application No. 61/932319, filed Jan. 28, 2014, which is incorporated herein by reference.

FIELD OF THE INVENTION

The following relates to positron emission tomography (PET) imaging, and more specifically to a single detector for PET imaging. It also relates to single photon emission computed tomography (SPECT) imaging.

BACKGROUND OF THE INVENTION

Within medical imaging, there are several different methods used to develop images for medical diagnosis of a patient. These methods include ultrasound (US), magnetic resonance imaging (MRI), computed tomography (CT), single photon emission computed tomography (SPECT), and positron emission tomography (PET).

For PET and SPECT imaging, a patient is injected with a radiopharmaceutical. The radiopharmaceutical associated with PET imaging has a radionuclide that produces gamma particle photon pairs with opposing trajectories from positron annihilation. In SPECT imaging, single photons are produced from a radionuclide with a trajectory from the source of activity in the radionuclide.

Current PET Technology traditionally uses two distinct, separate, and opposing detectors to determine a Line of Response (LOR) of a positron emission event. This could be in the form of a ring (as in Whole Body PET) or as paddles in a high resolution PET system. This is needed in order to detect two distinct gamma particles moving in opposite directions. Gamma particles are created from an event where a positron interacts with an electron and annihilation occurs.

When photons impact scintillation crystals, some gamma particles have energy transferred to visible light. This light is detected by a photomultiplier tube (PMT) or a silicon photo multiplier (SiPM). Electrical signals from the PMT or SiPM are used for event and position detection. These signals are typically in a pulse format that are sent to electrical circuits for amplification and pulse height detection.

With PET, when two gamma particles come into contact of each opposing detector, this is known as a true coincidence event. The timing window for this contact being detected between each detector typically has a range between 0 to 8 nanoseconds. A random event occurs when only one of the gamma particles comes into contact with one of the detectors. The random event cannot provide a LOR since two points were not detected to determine a line. A random coincidence event occurs when two gamma particles from two different annihilation events within the coincidence timing window. This can generate the LOR for imaging, but is incorrect since the LOR was created from two independent events and not a common single coincidence event. Random coincidence events can have a negative impact on the performance of a PET imaging machine.

The annihilation event occurs within the Field of View (FOV) in order for the true coincidence event to occur and determine the line of response for PET imaging. The time between the two gamma particles impacting the detectors for scintillation can be used to discriminate for random events. Random coincident events may be discriminated by other methods since they have the same time occurrences as the coincident event.

When gamma particles generated has a trajectory through material, there are three types of interactions that can occur. They are photoelectric process, Compton scattering process, and pair production process. The combined effects from these three processes are known as attenuation. The gamma photons will either pass through the material, be absorbed by the material or change its trajectory and "scatter". Based on a beam of photons entering into the material of initial intensity ($I_o$), the intensity attenuation of the gamma photons ($I_t$) can be determined:

$$I_t = I_o e^{-ux}$$

Where x is the thickness of the material and −u is the attenuation coefficient. The attenuation coefficient is dependent on the density of the material, and the photon energy of the gamma particle. For positron-electron annihilation and single photon emissions, the photon energy is typically 511 keV.

With SPECT technology, a single photon is emitted from events of radionuclide activity that is injected into a patient. The photons are detected through the use of a gamma camera where a 2D image is captured. The gamma camera uses collimators for line of sight detection of the emitted gamma photon. The camera is moved with different position and angles so that a 3D image can be generated.

As discussed above, conventional PET systems use two separate and opposing detectors for determining true coincidence of annihilation events. With the drawbacks of conventional systems discussed above, it would be desirable to have a single detector that can be used for three dimensional imaging in medical diagnostics. A multi-detector configuration, such as a ring configuration, is not needed with the use of a single detector or detector arrays. This single detector embodiment provides high resolution stationary scans with the detector in close proximity with the patient's body.

SUMMARY OF THE INVENTION

The present invention generally provides improved devices, systems, and methods for three dimensional imaging in medical diagnostics using a single detector. Some of the advantages of a single detector are lower cost and higher mobility than current PET devices.

Provided is a plurality of detector configurations that uses gamma particle intensity attenuation materials that are positioned next to scintillation crystals. The attenuation materials can provide either a shadow or collimation effect to the scintillation crystals based on the location gamma particle source of activity above the detector configurations. This shadow effect provides angle information about location of source activity without the use of an LOR from coincidence events or a two detector PET system.

The plurality of single detector configurations of this embodiment is independent from coincidence events for PET imaging. These detector configurations are then inherently immune to random and random coincidence events. Therefore, method for discrimination of these types of events is not needed by the system of this embodiment.

A single detector gamma camera is used for SPECT imaging systems and is dependent on scanning methods where the detector is moved to different positions and angles in order to reconstruct a 3D image. The plurality of single detector configurations of this embodiment provides 3D imaging from single photon emissions from a stationary position. Unlike SPECT imaging systems, these detector configurations include collimated as well as non-collimated photons for imaging.

BRIEF DESCRIPTION OF THE DRAWINGS

FIG. 2a shows a perspective view of a three dimensional representation of a detector block configuration. FIG. 2b shows a sectional side view of a portion of the detector array. It continues in each horizontal direction since the construction materials are alternating repetitively.

FIG. 5a shows a hexagonal geometry for both the crystal pixels and the shielding attenuation material. FIG. 5b shows a square geometry for both the crystal pixels and shielding attenuation material.

DETAILED DESCRIPTION

The present invention provides a single detector used to detect particles, for example gamma particles, from a positron emission can provide a low cost, extremely portable solution. A single detector allows for a hand held scanner module similar to an ultra sound scanner.

The present invention also provides a method for a Field of View (FOV) deep into the chest wall, which is a limitation from the current PET/PEM technology and digital mammography. It also addresses the issue where digital mammography can provide false positives with dense breast tissue.

A single ended detector PET scanner adds flexibility in that it can easily adapt to scanning different parts of the body such as the thyroid, and other soft tissue. The single detector is not dependent on coincident events and is immune to random and random coincident events that occur within the FOV.

Current PET scanners require a radiopharmaceutical injection for the whole body. For high resolution localized scanning, the injection must not be in close proximity to the FOV for the scan since random coincident events affect the image performance. With a single ended detector, a localized injection could be done since random coincident event have no effect on detection. A localized injection minimizes prep time, exposure and makes it more convenient than current PET scans.

Some embodiments of the single detector places pixelated crystals next to shielded material with a greater height, alternating the pixelated crystal slices with shielding material slices. A point source within the FOV space will emit gamma particles toward the single detector. Depending upon the location of the point source with the FOV, the shielding will reduce the radiation intensity on the opposite side of the shield creating a "shadow" effect that ends based on the angle from the top of the shield to the end of the shadow. This angle can then be extrapolated to the position of the point source for mapping. Since there is more than one shield slice, the shadow angle increases for each slice positioned closer to the source location. Eventually, the slices closest to the point source will be fully exposed to the source and no shadow will exist.

Figure 1:
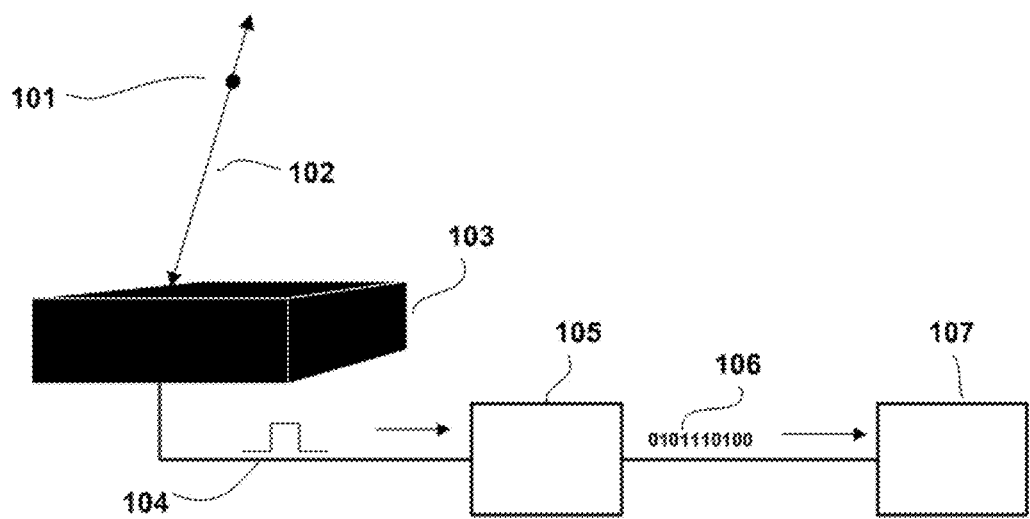
FIG. 1 provides a system view of the single detector imaging machine from photon event occurring to image reconstruction. This figure can be applied to both PET and SPECT technologies.

The single detector imaging system is used to detect photon events from a source of activity and reconstruct an image to indicate the location of the source of activity. FIG. 1 shows the basic assemblies for this embodiment in imaging. Events from a source of activity 101 are created from positron emission or single photon emission within a radionuclide. When these events occur within the FOV of the detector assembly 103, some events can be detected that have a trajectory 102 that impacts the detector assembly 103. The detector assembly 103 is able to convert the energy of the photon into electrical pulses 104. Characteristics of electrical pulses 104 provides data representation of X and Y positioning information for the location of where scintillation occurred within the detector from impact of the photon particle. The electrical pulses are detected by front end electronic assembly 105 and convert the X and Y data from the pulses 104 into binary data 106. The binary data 106 provides a format for the X and Y positioning that is understood by a computer assembly 107. The computer captures the binary data 106, generates a two dimensional histogram for all binary data 106 captured, and reconstructs an image that is then projected onto a display within the computer assembly 107.

Figure 2A:
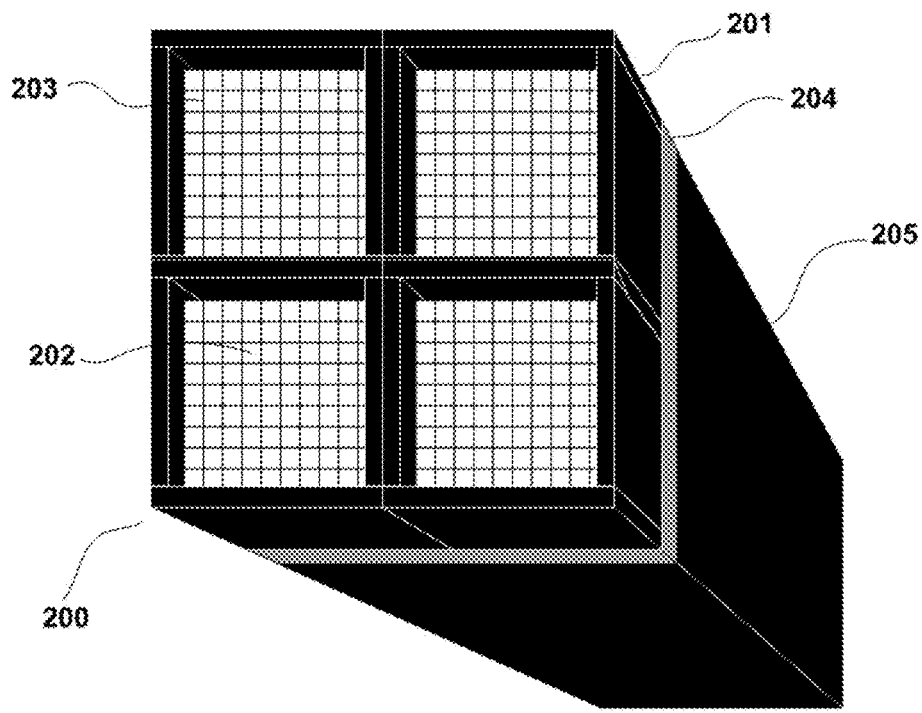
FIGS. 2a and 2b show two different views of one embodiment of a detector construction.

FIG. 2a shows one embodiment of a basic construction of a single detector block 200 that is used to detect gamma photons emitted from a radiopharmaceutical injected into a patient. The radiopharmaceutical can provide single emission photons as in SPECT imaging or paired positron emission photons for PET imaging. In some embodiments, multiple detector blocks can be connected together to form an array and increase detection surface area. Increased incidental surface area improves system detection performance for higher sensitivity and increased field of view (FOV). The shape of the scintillation crystals 202 in this embodiment are square, but can be in different shapes and sizes. In some embodiments, the material of crystals 202 may be bismuth germinate (BGO), sodium iodide doped in thallium NaI(TI), lutetium yttrium oxyorthosilicate doped with cerium (LYSO:Ce), or other crystals used for a scintillation process. The crystals 202 are pixelated in that they are typically cut 1 to 4 mm in width and length but not limited to these dimensions. They are connected together with a thin optical isolation material or film 203 between them for separation. This film 203 is reflective on both sides so the light energy is not lost or contaminated into neighboring crystals during the scintillation process. The reflective film 203 is also applied to the top of the crystals 202 to ensure maximum light transfer to the PMT 205.

The pixelated crystals 202 are connected and arranged to form a crystal element that is surrounded by attenuation material 201. Material 201 is typically used as shield from radiation exposure or as a collimator in gamma cameras in SPECT systems. In the construction of this detector block, the walls of material 201 are thick enough to significantly attenuate photons. The materials used for a detector block for attenuation can be tungsten, lead, or other high density materials that attenuate gamma particles. For tungsten, the half value layer (HVL) is between 3 and 4 mm which is the thickness needed to attenuate half the photons that incidentally enter the attenuating material 201. This value is based on the intensity attenuation equation. Like the shape of the pixelated crystal 202, the geometry of the attenuation material 201 around each crystal element can be in the form of various shapes and different from the crystal 202 shape itself. Multiple or single crystal elements can be formed on a single detector block.

Figure 2B:
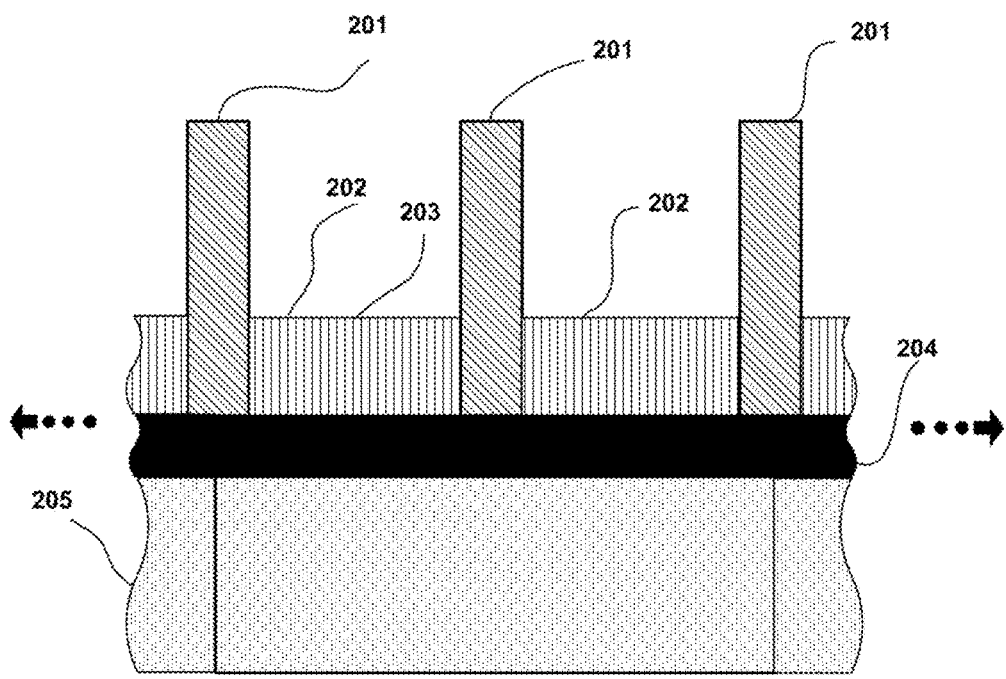

The depth or thickness of the pixelated crystals 202 is shown FIG. 2b. The thickness of these crystals is dependent on the density or stopping power of the material. This is usually between 10 mm and 15 mm, but the invention is not limited to this range. The number of pixels for the crystal 202 should be greater than six in order to develop a histogram count pattern with certain resolution. More pixels will give a better resolution of the count pattern and system. On each side of the crystals 202 at the end of each crystal element, the attenuation shield 201 is connected. This material is relatively taller than the crystal surface and extends down to and even with the bottom of the crystals 202 or can continue and make contact with the PMT 205 directly.

Both the shield 201 and the crystals 202 are connected to one side of an optic coupler 204. The opposite side of the coupler is connected to a PMT or SiPM 205. The coupler 204 provides a method to appropriately transfer the light energy created from the scintillation process of the crystals 202 to the PMT 205. It also provides adhesion of the crystals 202 and shield 201 to the PMT 205. Materials can vary for the coupler 204 and can include light guides, translucent adhesive, resin or glass, but is not limited to these materials.

FIG. 2b also indicates the detector block being extended horizontally into a detector array. This extension can continue until the length is sufficient for the FOV identified by the system geometry such as ring, partial ring, or a paddle.

Figure 3:
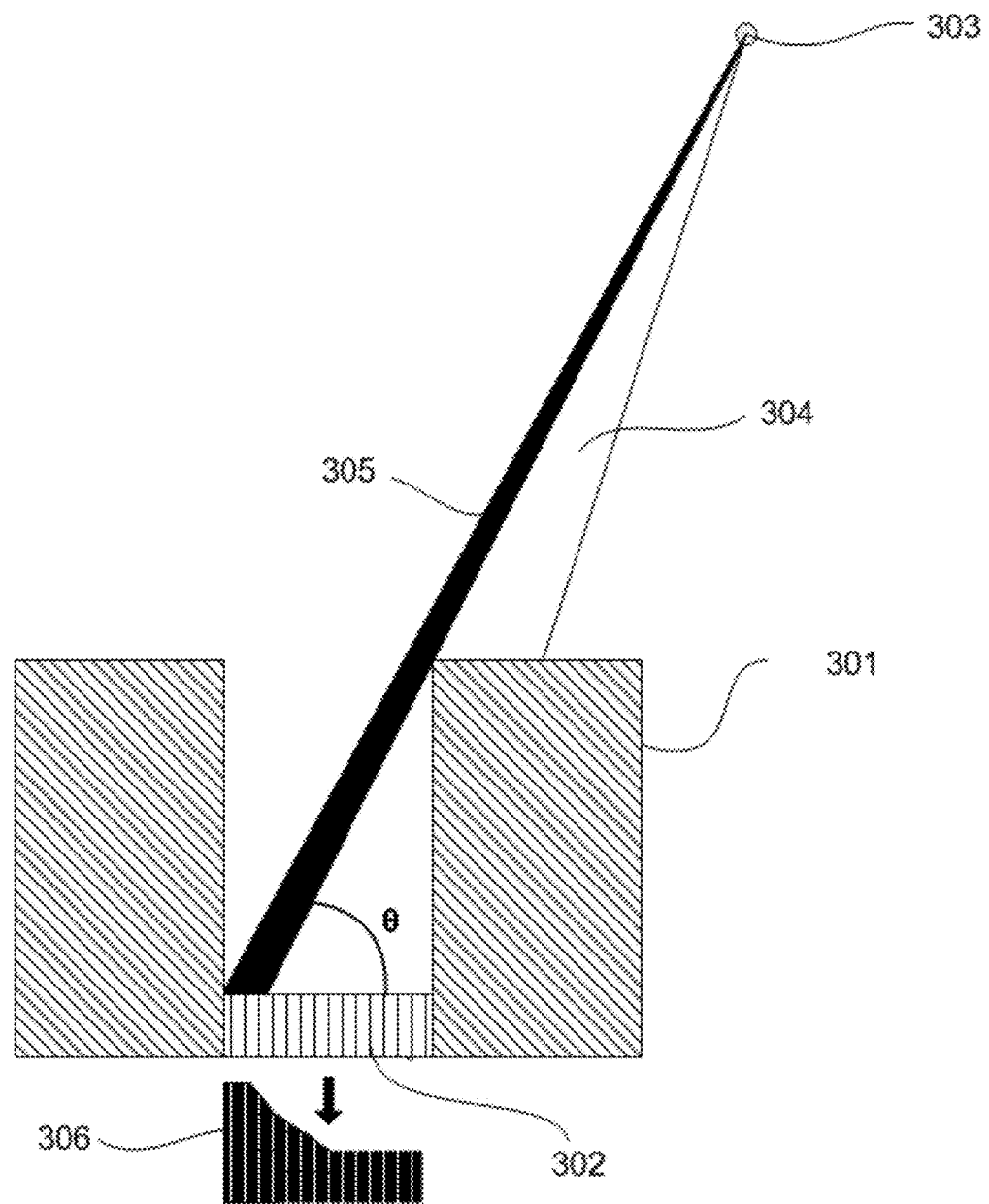
FIG. 3 shows a sectional side view of a portion of the detector illustrating the shadow technique created from photon intensity attenuation due to interaction with material. The image shows two beams of gamma particles with a trajectory that is passing through attenuation material and one beam that is not due to line of sight. The image indicates a shadowing effect being detected by the scintillation crystals based on the trajectories of these two photon beams.

For FIG. 3, the height of the attenuation shield 301 from the crystal surface should be between half of the width to the full width of the crystal element 302. The height can be outside this range, but if the shield 301 is too high; it will collimate events for each crystal element within the FOV. If it is too short, the shield will not serve its purpose of attenuating events since most crystal elements will have a line of sight of the activity source 303. The height of the shield 301 directly impacts the dimensions of the FOV. This cross sectional view of a crystal element 302 and associated raised shields 301 in FIG. 3 are used to show how a shadow is created from narrow beams 305 with a line of sight to the crystal element 302. Narrow beams 304 have a trajectory through the attenuation shield 301 and are not in the line of sight of the crystal element 202. As photons interact with the shield material 301, some are attenuated and the intensity of the photon beam 304 is less that than the line of sight photon beam 305.

A photon intensity difference between beams 304 and 305 casts a gamma particle shadow on the crystal element 302. The detector is able to provide X and Y scintillation position information to the imaging system. A count of scintillations at each pixel of the crystal element 302 is accumulated. A histogram 306 is produced with each histogram bin representing a pixel of the crystal element 302. The histogram pattern is able to indicate the bin where beam 304 shadow ends and the line of sight beam 305 begins. This location on the crystal element 302 provides an angle to the source of activity 303. As the height or location of the activity source 303 changes, the shadow responds with a histogram pattern that provides an appropriate angle to the repositioned activity source 303.

Figure 4:
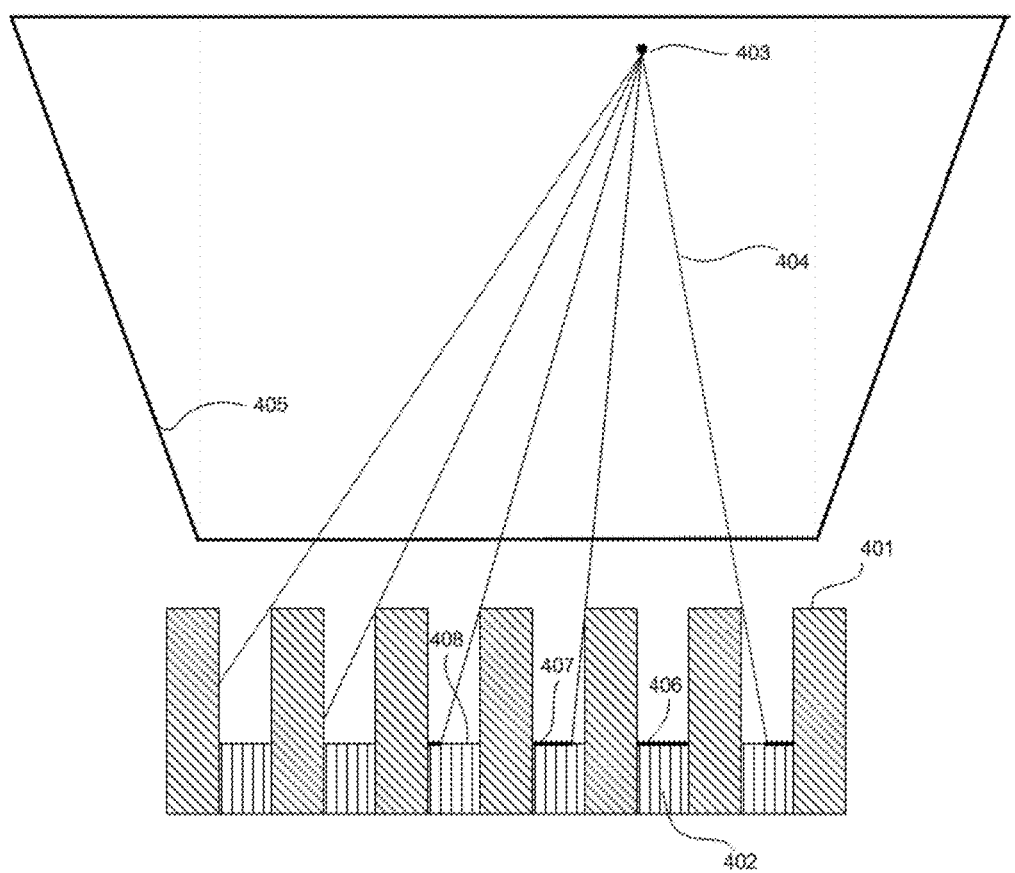
FIG. 4 shows a sectional side view of the detector with different angles of shadow projections being created based on the location of the source of activity. It also shows the effects from a collimator when activity is in line of sight of all scintillation crystals of a crystal element.

The detector may have multiple crystal elements 402 within its array as shown in FIG. 4. The location of each crystal element 402 varies relative to the source of activity 403. If a crystal element 407 and 408 has pixels that partially have a line of sight to the source 403, a shadow line 404 is created. The angles formed for all shadow lines 404 in each crystal element with partial line of sight can indicate the height and the source of activity 403. With all pixels of a crystal element 406 having line of sight for the source of activity 403, the crystal element 406 acts as a collimator for the incident photons. This collimator 406 can provide X and Y positioning, the height, as well as the size of the activity source 403.

Identifying the location of activity source 403 in FIG. 4 can be done if it is located with the FOV 405. The FOV 405 dimensions are dependent on the height of the attenuation shield 401, the width of the crystal element 402, and the size and geometry of the detector array.

Figure 5A:
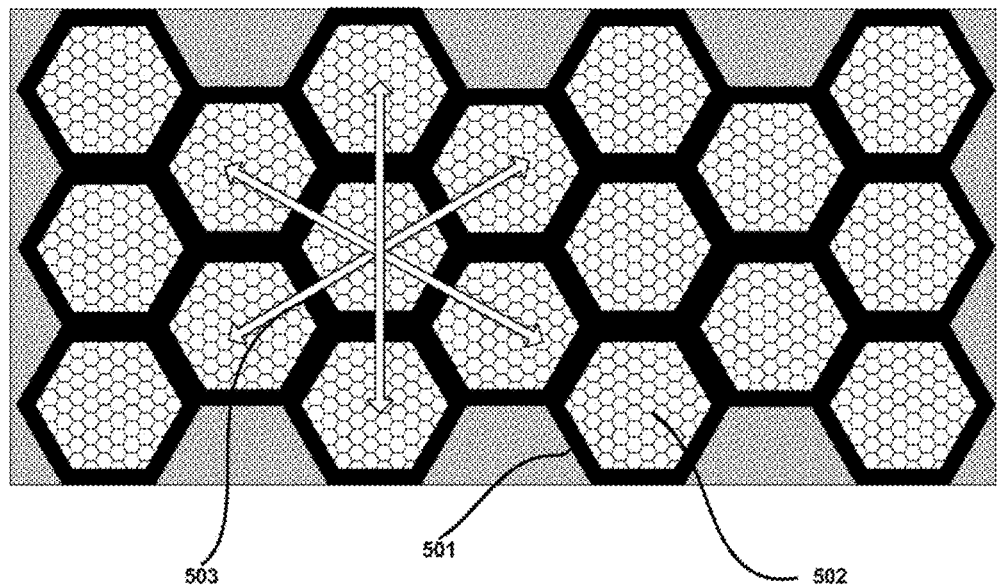
FIGS. 5a and 5b show top views of two embodiments of different possible geometries of the detector array. The pixelated crystals and attenuation shielding material can provide the shadow effects using various shapes.
Figure 5B:
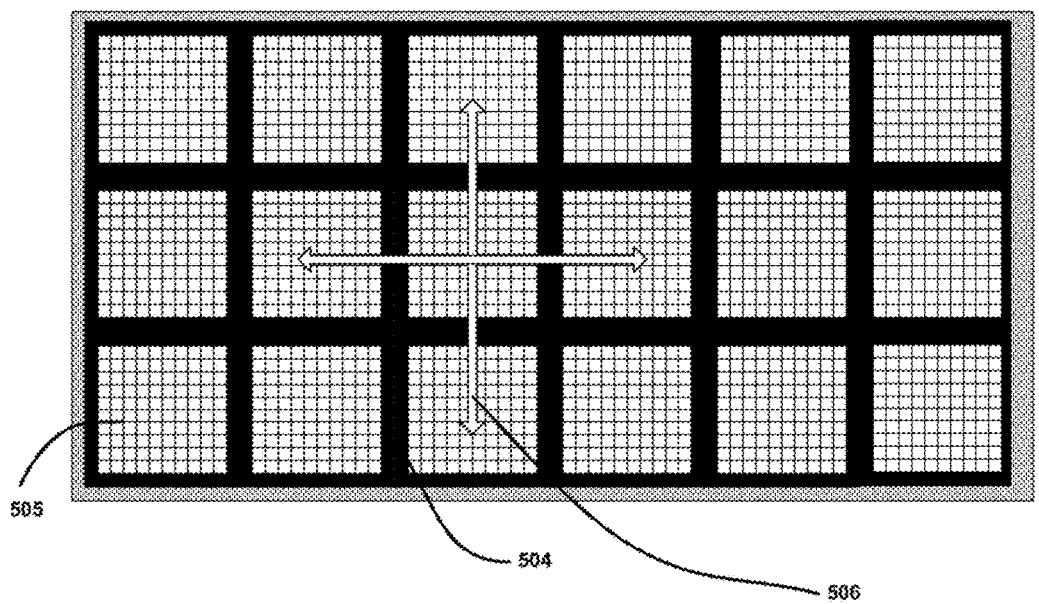

FIG. 3 and FIG. 4 show a two dimensional representation of the shadow effect created with a two dimensional histogram shown. The detector is able to provide a three dimensional histogram, where the histogram pattern is reviewed along multiple axes that the detector geometry can support. FIG. 5a and FIG. 5b show embodiments of a top view of two detector array geometries that could be constructed. FIG. 5a shows hexagonal geometry, such that the histogram pattern can be reviewed in three axes 503. The square geometry shown in FIG. 5b can support a histogram pattern review on two axes 506.

The geometry of the detector is not limited to a hexagon or a square and can be in a variety of shapes such as octagon, rectangle, or circle. The shape of the attenuation shield 501 and 504 does not have to match the shape of the pixelated crystals 502 and 505.

Figure 6:
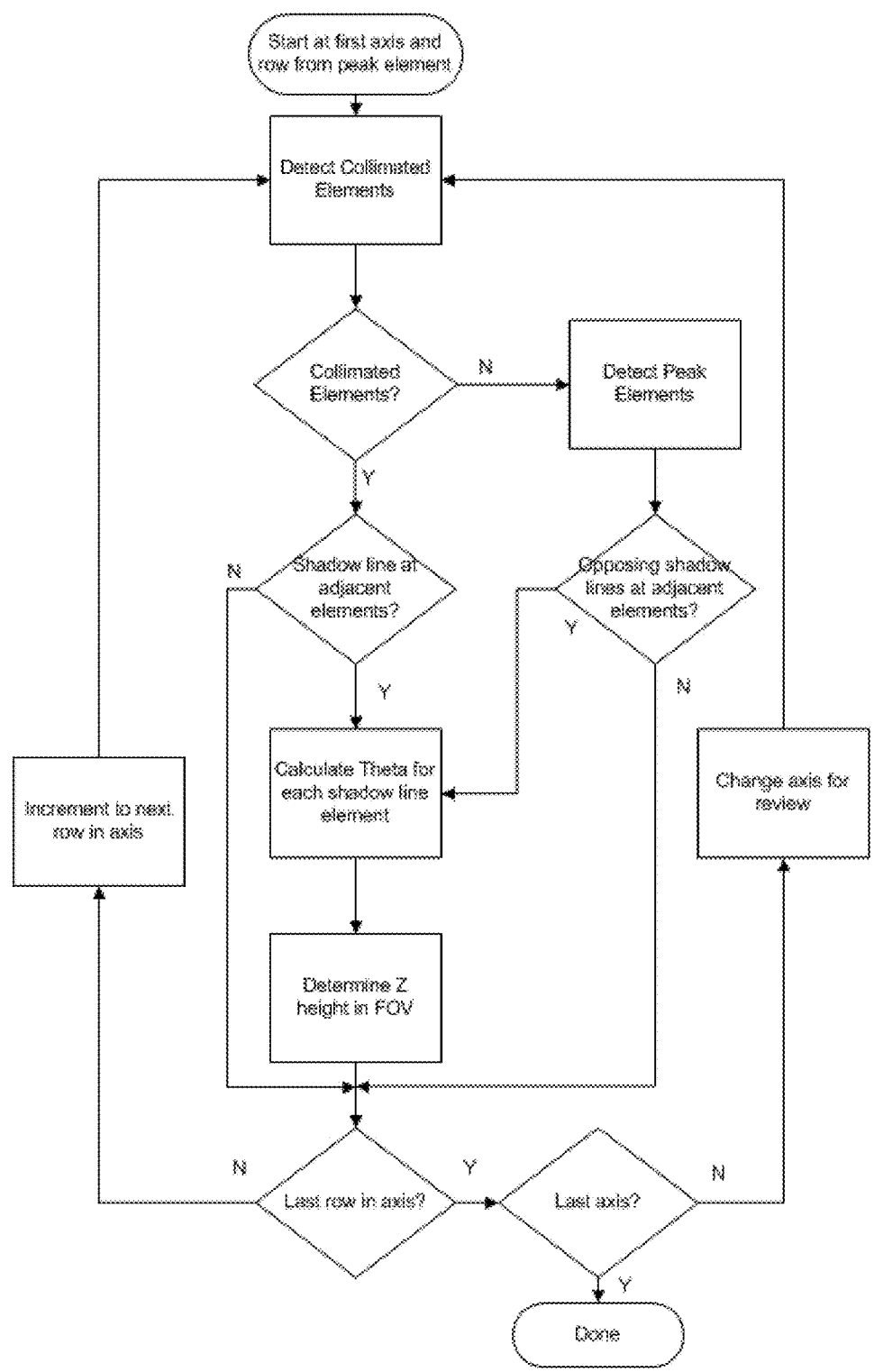
FIG. 6 is a flow chart that shows a method for determining the height of the source of activity needed for 3D reconstruction. The flow chart is based on the number of crystal elements and axis of rotation that the geometry the detector provides.

With two dimensional histogram data captured, the process for determining the location of a source of activity for the X and Y position can be done with from collimated crystal elements. This process is similar to that of a gamma camera. The process for determining height location of a source of activity is shown in FIG. 6. With the two dimensional histogram data, a pattern is reviewed based on an axis and row associated with the geometry of the detector array. The source of activity location will generate peak and collimated bin counts for crystal elements below the activity. The dimensions of the source of activity will determine the quantity and location of collimated crystal elements detected. Non-collimated crystal elements next to the collimated elements identified can provide shadow line information that represents the angle to the source of activity. From a two dimensional histogram perspective, shadow line angles can provide a three dimensional representation for the height of the source of activity above the detector surface. The process in flow chart FIG. 6 determines the peak bin count from the histogram. It then determines if the histogram bins for the element are collimated or non-collimated. If the peak element has collimated bin counts, an axis and row is determined for histogram pattern review. The bin count pattern is reviewed along the axis and row for each element and determining if the element is collimated or non-collimated. If it is non-collimated and a shadow line exists, the angle is calculated for the line toward the source of activity. The review along a row stops if no shadow line exists and the process begins in the next row along the predetermined axis. When all rows have been reviewed within the predetermined axis, the review is shifted to the next axis and the process is conducted again along the rows until all axes have been reviewed. The review can produce enough angles and collimated crystal elements to reconstruct the X, Y and Z positioning of the source of activity. To detect for multiple sources, the histogram is reviewed for additional collimated peak elements. The review can produce enough angles and collimated crystal elements to reconstruct the X, Y and Z positioning of the multiple sources of activity.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claim.

The invention claimed is:

1. A single stationary detector head for three dimensional positron emission tomography imaging or single photon emission tomography from a stationary position comprising:
    a photomultiplier tube or silicon photomultiplier;
    a plurality of groups of scintillation crystal slices, each group of scintillation crystal slices comprising a plurality of scintillation crystal slices, mounted on the photomultiplier tube or silicon photomultiplier; and
    a plurality of shielding material slices mounted on the photomultiplier tube or silicon photomultiplier having a height greater than a height of the crystal slices, the shielding material slices each alternating with each group of scintillation crystal slices in a repeating pattern, beginning and ending with the shielding material slice,
    wherein the shielding material slices generate a plurality of shadows detected by the scintillation crystal slices based on a location of a source of activity emitting gamma particles toward the detector head within a field of view.

2. The apparatus of claim 1, wherein the height of the shielding slices determine the field of view on the scintillation crystal slices.

3. The apparatus of claim 1, wherein the groups of scintillation crystal slices and shielding material slices form an array, and the field of view dimensions are dependent on the height of the shielding material slices, the width of the crystal slices, and the size and geometry of the array.

4. The apparatus of claim 1, wherein the shielding material slices are pixilated.

5. The apparatus of claim 1, wherein each shadow on the scintillation crystal slices has an angle, wherein the angles are then extrapolated to determine a position of the source of activity emitting gamma particles.

6. The apparatus of claim 5, wherein the shadow angle increases for each shadow on the scintillation crystal slices positioned closer to the location of the source of activity.

7. The apparatus of claim 5, wherein the extrapolated angles determine a three dimensional representation of a distance of the source of activity from the single detector head.

8. The apparatus of claim 1, further comprising an optical coupler positioned between the scintillation crystal slices and photomultiplier tube or silicon photomultiplier.

9. A single detector imaging system for detecting and locating positron emissions or photon emissions from a source of activity from a stationary position comprising:
    a single stationary detector head comprising:
        a photomultiplier tube or silicon photomultiplier;
        a plurality of groups of scintillation crystal slices, each group of scintillation crystal slices comprising a plurality of scintillation crystal slices, mounted on the photomultiplier tube or silicon photomultiplier; and
        a plurality of shielding material slices mounted on the photomultiplier tube or silicon photomultiplier having a height greater than a height of the crystal slices, the shielding material slices each alternating with each group of scintillation crystal slices in a repeating pattern, beginning and ending with the shielding material slice,
        the groups of scintillation crystal slices and shielding material slices forming an array;
        wherein the shielding material slices generate a plurality of shadows detected by the groups of scintillation crystal slices based on a location of the source of activity emitting positron emissions or photon emissions toward the detector head within a field of view;
    wherein the detector is configured to convert the positron emissions or photon emissions contacting the scintillation crystal slices into electrical pulses, wherein characteristics of electrical pulses provide data representation of X and Y positioning information for a location of where scintillation events occurred within the single stationary detector head from impact of the position emissions or photon emissions;
    an electronic assembly coupled to the detector configured to convert the X and Y data from the pulses into binary data; and
    a computer coupled to the electronic assembly configured to receive the binary data and determine a three dimensional representation of a position of the source of activity from the single stationary detector head.

10. The system of claim 9, wherein the electronic assembly is part of the computer.

11. The system of claim 9, wherein each shadow on the scintillation crystal slices has an angle, wherein the angles are then extrapolated to determine the position of the source of activity.

12. The system of claim 11, wherein the shadow angle increases for each shadow on the scintillation crystal slices positioned closer to the location of the source of activity.

13. The system of claim 11, wherein the extrapolated angles determine a three dimensional representation of a distance of the source of activity from the single detector head.

14. A process of using a single stationary detector head for determining the location of a source of activity comprising:
    providing a single stationary detector head comprising:
        a photomultiplier tube or silicon photomultiplier;

a plurality of groups of scintillation crystal slices, each group of scintillation crystal slices comprising a plurality of scintillation crystal slices, mounted on the photomultiplier tube or silicon photomultiplier; and a plurality of shielding material slices mounted on the photomultiplier tube or silicon photomultiplier having a height greater than a height of the crystal slices, the shielding material slices each alternating with each group of scintillation crystal slices in a repeating pattern, beginning and ending with the shielding material slice, the groups of scintillation crystal slices and shielding material slices forming an array;

wherein the shielding material slices generate a plurality of shadows detected by the groups of scintillation crystal slices based on the location of the source of activity emitting gamma particles toward the detector head within a field of view;

detecting the plurality of shadows by the scintillation crystal slices within the field of view from a stationary position; and determining a distance of the source of activity from the single stationary detector head using the plurality of shadows.

15. The process of claim 14, wherein determining a distance of the source of activity includes determining an X and Y positioning of the source of activity, a height of the source of activity, and/or a size of the source of activity.

16. The process of claim 14, wherein detecting the plurality of shadows includes generating a three dimensional histogram.

17. The process of claim 16, wherein the histogram is reviewed along multiple axes of the array.

18. The process of claim 14, wherein dimensions of the field of view are dependent on the height of the shielding material slices, a width of the crystal slices, and a size and geometry of the array.

19. The process of claim 14, wherein each shadow on the scintillation crystal slices has an angle, wherein the angles are then extrapolated to determine the position of the source of activity.

20. The process of claim 19, wherein the shadow angle increases for each shadow on the scintillation crystal slices positioned closer to the location of the source of activity.

21. A process of using a single detector head for determining the location of a source of activity comprising:
providing a single stationary detector head comprising:
a photomultiplier tube or silicon photomultiplier;
a plurality of groups of scintillation crystal slices, each group of scintillation crystal slices comprising a plurality of scintillation crystal slices, mounted on the photomultiplier tube or silicon photomultiplier; and a plurality of shielding material slices mounted on the photomultiplier tube or silicon photomultiplier having a height greater than a height of the crystal slices, the shielding material slices each alternating with each group of scintillation crystal slices in a repeating pattern, beginning and ending with the shielding material slice, the scintillation crystal slices and shielding material slices forming an array;

wherein the shielding material slices generate a plurality of shadows detected by the groups of scintillation crystal slices based on the location of the source of activity emitting gamma particles toward the detector head within a field of view;

detecting the plurality of shadows by the groups of scintillation crystal slices within the field of view, wherein detecting the plurality of shadows includes generating a three dimensional histogram; and determining a distance of the source of activity from the single detector head using the plurality of shadows.

22. The process of claim 21, wherein determining a distance of the source of activity includes determining an X and Y positioning of the source of activity, a height of the source of activity, and/or a size of the source of activity.

23. The process of claim 21, wherein the histogram is reviewed along multiple axes of the array.

24. The process of claim 21, wherein dimensions of the field of view are dependent on the height of the shielding material slices, a width of the crystal slices, and a size and geometry of the array.

25. The process of claim 21, wherein each shadow on the scintillation crystal slices has an angle, wherein the angles are then extrapolated to determine the position of the source of activity.

26. The process of claim 21, wherein the shadow angle increases for each shadow on the scintillation crystal slices positioned closer to the location of the source of activity.

27. A single detector head for three dimensional positron emission tomography imaging or single photon emission tomography comprising:
a photomultiplier tube or silicon photomultiplier;
a plurality of groups of scintillation crystal slices, each group of scintillation crystal slices comprising a plurality of scintillation crystal slices, mounted on the photomultiplier tube or silicon photomultiplier; and
a plurality of shielding material slices mounted on the photomultiplier tube or silicon photomultiplier having a height greater than a height of the crystal slices, the shielding material slices each alternating with each group of scintillation crystal slices in a repeating pattern, beginning and ending with the shielding material slice, wherein the shielding material slices generate a plurality of shadows detected by the groups of scintillation crystal slices based on a location of a source of activity emitting gamma particles toward the detector head within a field of view, wherein the plurality of shadows detected includes generating a three dimensional histogram.

28. The apparatus of claim 27, wherein the height of the shielding slices determine the field of view on the scintillation crystal slices.

29. The apparatus of claim 27, wherein the scintillation crystal shoes and shielding material shoes form an array, and the field of view dimensions are dependent on the height of the shielding material slices, a width of the crystal slices, and a size and geometry of the array.

30. The apparatus of claim 27, wherein the shielding material slices are pixilated.

31. The apparatus of claim 27, wherein each shadow on the scintillation crystal slices has an angle, wherein the angles are then extrapolated to determine the position of the source of activity emitting gamma particles.

32. The apparatus of claim 31, wherein the shadow angle increases for each shadow on the scintillation crystal shoes positioned closer to the location of the source of activity.

33. The apparatus of claim 31, wherein the extrapolated angles determine a three dimensional representation of a distance of the source of activity from the single detector head.

34. The apparatus of claim 27, further comprising an optical coupler positioned between the scintillation crystal slices and photomultiplier tube or silicon photomultiplier.

35. A single detector imaging system for detecting and locating positron emissions or photon emissions from a source of activity comprising:
 a single detector head comprising: a photomultiplier tube or silicon photomultiplier;
 a plurality of groups of scintillation crystal slices, each group of scintillation crystal slices comprising a plurality of scintillation crystal slices, mounted on the photomultiplier tube or silicon photomultiplier; and
 a plurality of shielding material slices mounted on the photomultiplier tube or silicon photomultiplier having a height greater than a height of the crystal slices, the shielding material slices each alternating with the group of scintillation crystal slices in a repeating pattern, beginning and ending with the shielding material slice, the scintillation crystal shoes and shielding material shoes forming an array;
 wherein the shielding material slices generate a plurality of shadows detected by the groups of scintillation crystal slices based on a location of the source of activity emitting positron emissions or photon emissions toward the detector head within a field of view, wherein the plurality of shadows detected includes generating a three dimensional histogram;
 wherein the detector is configured to convert the positron emissions or photon emissions contacting the scintillation crystal shoes into electrical pulses, wherein characteristics of electrical pulses provide data representation of X and Y positioning information for the location of where scintillation occurred within the single detector head from impact of the positron emissions or photon emissions;
 an electronic assembly coupled to the detector configured to convert the X and Y data from the pulses into binary data; and
 a computer coupled to the electronic assembly configured to receive the binary data and determine a three dimensional representation of a position of the source of activity from the single detector head.

36. The system of claim 35, wherein the electronic assembly is part of the computer.

37. The system of claim 35, wherein each shadow on the scintillation crystal slices has an angle, wherein the angles are then extrapolated to determine the position of the source of activity.

38. The system of claim 37, wherein the shadow angle increases for each shadow on the scintillation crystal slices positioned closer to the location of the source of activity.

39. The system of claim 37, wherein the extrapolated angles determine a three dimensional representation of a distance of the source of activity from the single detector head.

* * * * *